United States Patent
Ok (10) Patent No.: US 10,152,065 B2
(45) Date of Patent: Dec. 11, 2018

(54) VALVE

(71) Applicant: Bitron Ind. China Co., Ltd., Qingdao (CN)

(72) Inventor: Dae Hong Ok, Gyeonggi-do (JP)

(73) Assignee: BITRON IND. CHINA CO., LTD., Qingdao (CN)

( * ) Notice: Subject to any disclaimer, the term of this patent is extended or adjusted under 35 U.S.C. 154(b) by 53 days.

(21) Appl. No.: 15/362,014

(22) Filed: Nov. 28, 2016

(65) Prior Publication Data

US 2017/0248974 A1 Aug. 31, 2017

(30) Foreign Application Priority Data

Feb. 29, 2016 (KR) .................. 10-2016-0024243

(51) Int. Cl.
| | |
|---|---|
| *G05D 16/06* | (2006.01) |
| *G05D 7/06* | (2006.01) |
| *B01D 35/02* | (2006.01) |
| *F16K 1/38* | (2006.01) |
| *F16K 7/12* | (2006.01) |
| *F16K 31/06* | (2006.01) |
| *G05D 7/01* | (2006.01) |
| *F16K 31/40* | (2006.01) |
| *G05D 16/02* | (2006.01) |

(52) U.S. Cl.
CPC .......... *G05D 7/0635* (2013.01); *B01D 35/02* (2013.01); *F16K 1/38* (2013.01); *F16K 7/12* (2013.01); *F16K 31/0655* (2013.01); *F16K 31/0658* (2013.01); *F16K 31/402* (2013.01); *G05D 7/0106* (2013.01); *G05D 16/02* (2013.01); *G05D 16/0663* (2013.01); *Y10T 137/87917* (2015.04)

(58) Field of Classification Search
CPC ...................................................... F16L 55/24
See application file for complete search history.

(56) References Cited

U.S. PATENT DOCUMENTS

| | | | | |
|---|---|---|---|---|
| 1,159,431 | A * | 11/1915 | Swanstrom | ........ G05D 16/0663 137/505.37 |
| 1,494,966 | A * | 5/1924 | Twardowsky | ........ F25B 41/062 137/505.3 |
| 2,405,010 | A * | 7/1946 | Bucknam | ........... G05D 16/0663 137/100 |
| 2,888,237 | A * | 5/1959 | Dahl | .................... F16K 31/0658 138/46 |

(Continued)

FOREIGN PATENT DOCUMENTS

KR 10-2010-0034927 A 4/2010

*Primary Examiner* — Umashankar Venkatesan
(74) *Attorney, Agent, or Firm* — The PL Law Group, PLLC (57) ABSTRACT

A valve includes an inlet unit including an inlet hole into which a fluid is introduced, a pressure adjusting unit which adjusts a pressure of the fluid introduced through the inlet unit, and a discharging unit having an opening and closing member which selectively discharges the fluid which had its pressure adjusted, and a water outlet hole which discharges the fluid passing through the opening and closing member to the outside, wherein a cross-sectional area of the inlet hole is greater than a cross-sectional area of the water outlet hole and a flow direction of a fluid from the pressure adjusting unit to the opening and closing member and a flow direction of a fluid from the opening and closing member to the water outlet hole are perpendicular to each other.

7 Claims, 6 Drawing Sheets

(56) References Cited

U.S. PATENT DOCUMENTS

| | | | | |
|---|---|---|---|---|
| 3,073,345 | A | * | 1/1963 | Hagler ................ F16K 31/0651 |
| | | | | 137/625.65 |
| 3,368,582 | A | * | 2/1968 | Kozel .................... F16K 11/24 |
| | | | | 137/549 |
| 4,697,608 | A | * | 10/1987 | Kolze ................ F16K 31/0658 |
| | | | | 137/1 |
| 4,817,914 | A | * | 4/1989 | Pick .................... F16K 31/0658 |
| | | | | 251/129.15 |
| 5,209,253 | A | * | 5/1993 | Taylor .................. F16K 17/164 |
| | | | | 137/461 |
| 6,604,538 | B2 | * | 8/2003 | Schmotzer ........... G05D 7/0106 |
| | | | | 137/1 |
| 2017/0114913 | A1 | * | 4/2017 | Pearson ................ E03B 7/071 |

* cited by examiner

VALVE

CROSS-REFERENCE TO RELATED APPLICATION

This application claims priority to and the benefit of Korean Patent Application No. 10-2016-0024243, filed on Feb. 29, 2016, the disclosure of which is incorporated herein by reference in its entirety.

BACKGROUND

1. Field of the Invention

The present invention relates to a valve, and more particularly, to a valve in which a pressure adjusting unit having a pressure reducing function is embedded.

2. Discussion of Related Art

Currently, valves included in home appliances that use water such as washing machines, dishwashers, and refrigerators serve to appropriately adjust an amount of water according to operations of the home appliances. Further, the home appliances that use water are connected to water pipes, and open and close the water pipes in an electronic control method or the like in a state in which the water pipes are opened. A pressure reducing valve is installed in a water supply unit that supplies water into a space in which the water is used directly such as a washing tub of a washing machine and an ice maker of a refrigerator. Thus, when cold water and hot water are simultaneously supplied or cold water or hot water is supplied into the space, the water in a vicinity of the water supply unit caused by a backflow or overflow of the supplied water according to a water pressure and a flow rate of the supplied water is prevented from leaking.

An opening and closing valve that determines the supply of the water and the pressure reducing valve are installed separately in a conventional water supply unit. That is, the pressure reducing valve is separately installed at a front end or a back end of the opening and closing member, and thus prevents the above-described backflow or overflow of the water. However, when the pressure reducing valve is separately installed, noise is generated in the water supply unit in the case of a low pressure of supplied water, and thus an inconvenience to a user is caused. Further, an operating voltage is degraded at low water pressure and thus manufacturing costs of parts included in the water supply unit are increased. In addition, when the pressure reducing valve is installed separately from the opening and closing valve, excessive operation of the valve occurs at low water pressure, and thus there is a concern about breakage or damage of the valve.

SUMMARY

An embodiment of the present invention is directed to a valve into which a pressure adjusting unit having a pressure reducing function is integrated.

Further, an embodiment of the present invention is directed to a valve which minimizes operating noise generated at low water pressure.

Further, an embodiment of the present invention is directed to a valve of which manufacturing cost is improved by improving an operating voltage at a low water pressure.

Further, an embodiment of the present invention is directed to a valve which prevents breakage and damage caused in a process of operating at low water pressure.

According to an aspect of the present invention, there is provided a valve including an inlet unit including an inlet hole into which a fluid is introduced, a pressure adjusting unit which adjusts a pressure of the fluid introduced through the inlet unit, and a discharging unit having an opening and closing member which selectively discharges the fluid which had its pressure adjusted, and a water outlet hole which discharges the fluid passing through the opening and closing member to the outside, wherein a cross-sectional area of the inlet hole is greater than a cross-sectional area of the water outlet hole and a flow direction of a fluid from the pressure adjusting unit to the opening and closing member and a flow direction of a fluid from the opening and closing member to the water outlet hole are perpendicular to each other.

The pressure adjusting unit may include an accommodating unit which accommodates a fluid, a regulator which opens and closes an inlet of the accommodating unit, a diaphragm which adjusts a pressure of a fluid introduced into the accommodating unit, and an elastic member connected to the diaphragm.

A pressure of a fluid at a side of the water outlet hole may be equal to or less than a pressure of a fluid at a side of the inlet hole.

The regulator may include a shaft formed of a metal member and a lower member formed of rubber or plastic below the shaft.

The metal member may be stainless steel.

A bracket structure may be formed at a side of the inlet unit.

The inlet unit may include a mesh filter and a flow rate adjusting component.

The mesh filter may have a curved surface shape.

The opening and closing member may be a pilot-type solenoid.

The opening and closing member may be a direct acting solenoid.

BRIEF DESCRIPTION OF THE DRAWING

The above and other objects, features and advantages of the present invention will become more apparent to those of ordinary skill in the art by describing in detail exemplary embodiments thereof with reference to the accompanying drawings, in which.

DETAILED DESCRIPTION

Hereinafter, exemplary embodiments of the invention will be described in detail with reference to the drawings. However, these are only examples and the invention is not limited thereto.

In descriptions of the invention, when it is determined that detailed descriptions of related well-known functions unnecessarily obscure the gist of the invention, detailed descriptions thereof will be omitted. Some terms described below are defined by considering functions in the invention and meanings may vary depending on, for example, a user's or operator's intentions or customs. Therefore, the meanings of terms should be interpreted based on the scope throughout this specification.

The spirit and scope of the invention is defined by the appended claims. The following embodiments are only made to efficiently describe the technological scope of the invention to those skilled in the art.

Figure 1:
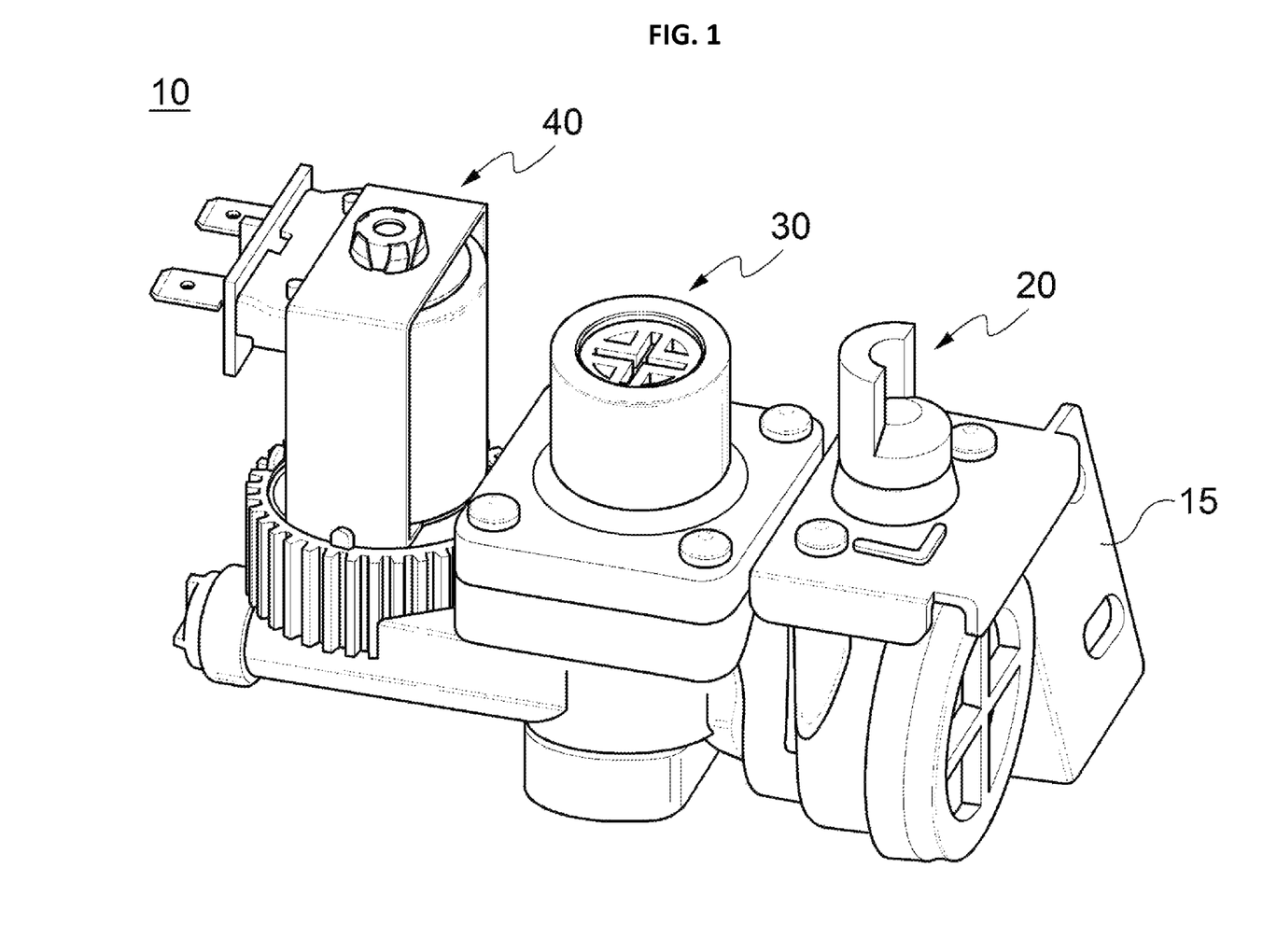
FIG. 1 is a perspective view illustrating a valve according to an embodiment of the present invention.

FIG. 1 is a perspective view illustrating a valve 10 according to an embodiment of the present invention.

Referring to FIG. 1, the valve 10 may include a pressure adjusting unit having a pressure reducing function therein. A bracket structure 15 may be formed at a side of an inlet unit of the valve 10 to connect a home appliance, in which a valve 10 is installed, to the valve 10.

Figure 2:
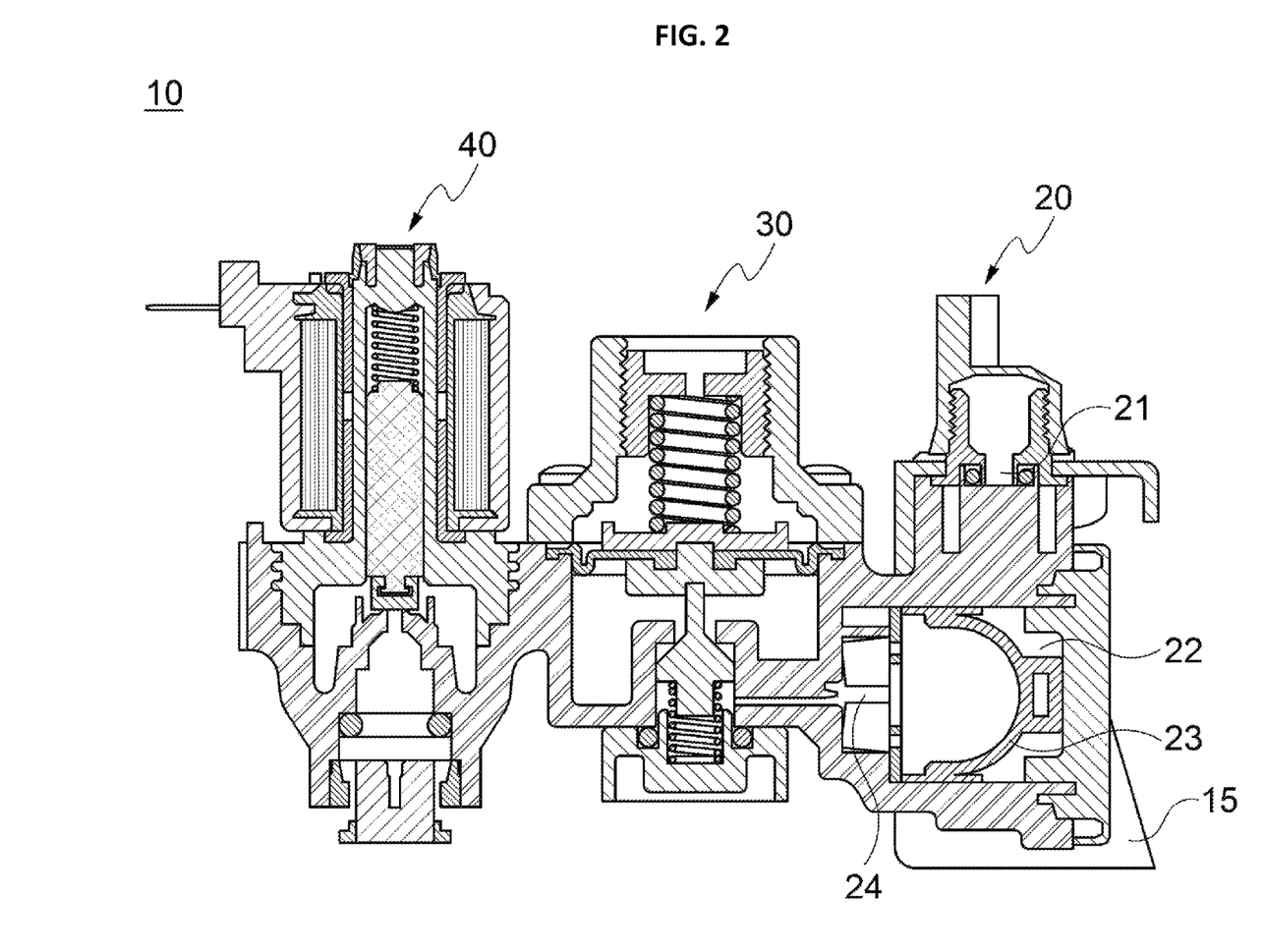
FIG. 2 is a cross-sectional view illustrating the valve according to the embodiment of the present invention.

FIG. 2 is a cross-sectional view illustrating the valve 10 according to the embodiment of the present invention.

Referring to FIG. 2, the valve 10 may include an inlet unit 20 into which a fluid is introduced, a pressure adjusting unit 30 which adjusts a pressure of the fluid introduced through the inlet unit 20, and a discharging unit 40 which discharges the fluid, which had its pressure adjusted in the pressure adjusting unit 30, to the outside.

The inlet unit 20 may include an inlet hole 21 which is an inlet into which a fluid is introduced. A fluid introduced through the inlet hole 21 passes through a mesh filter 23 installed in a space 22 in the inlet unit 20, and thus impurities included in the fluid may be filtered. The mesh filter 23 may have a curved surface shape. A flow rate of the fluid passing through the mesh filter 23 may be controlled by a flow rate adjusting component 24 before the fluid is introduced into the pressure adjusting unit 30.

Figure 3:
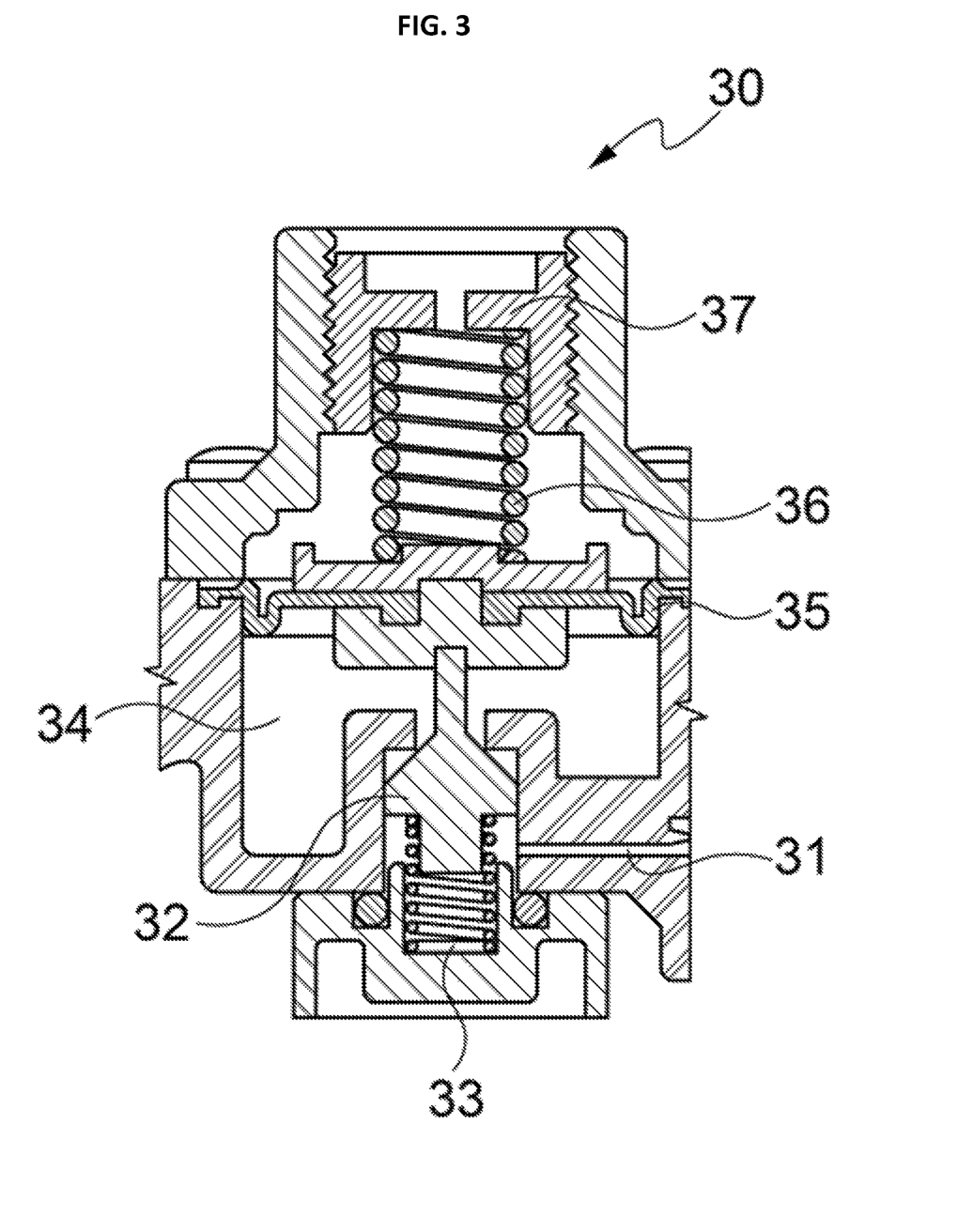
FIG. 3 is a cross-sectional view illustrating a pressure adjusting unit according to the embodiment of the present invention.

FIG. 3 is a cross-sectional view illustrating the pressure adjusting unit 30 according to the embodiment of the present invention.

Referring to FIG. 3, the pressure adjusting unit 30 may include a flow path 31 through which a fluid, which had its flow rate adjusted by the flow rate adjusting component 24, passes, a regulator 32 which opens and closes an inlet of an accommodating unit 34 which accommodates the fluid, an adjusting member 33 which adjusts an opening and closing operation of the regulator 32, a diaphragm 35 which adjusts a pressure of the fluid introduced into the accommodating unit 34, and an elastic member 36 connected to the diaphragm 35. One end of the elastic member 36 may be fixed by a lid 37.

The pressure of the fluid introduced into the accommodating unit 34 may be equal to or less than the pressure of the fluid before the fluid is introduced into the accommodating unit 34.

Figure 4:
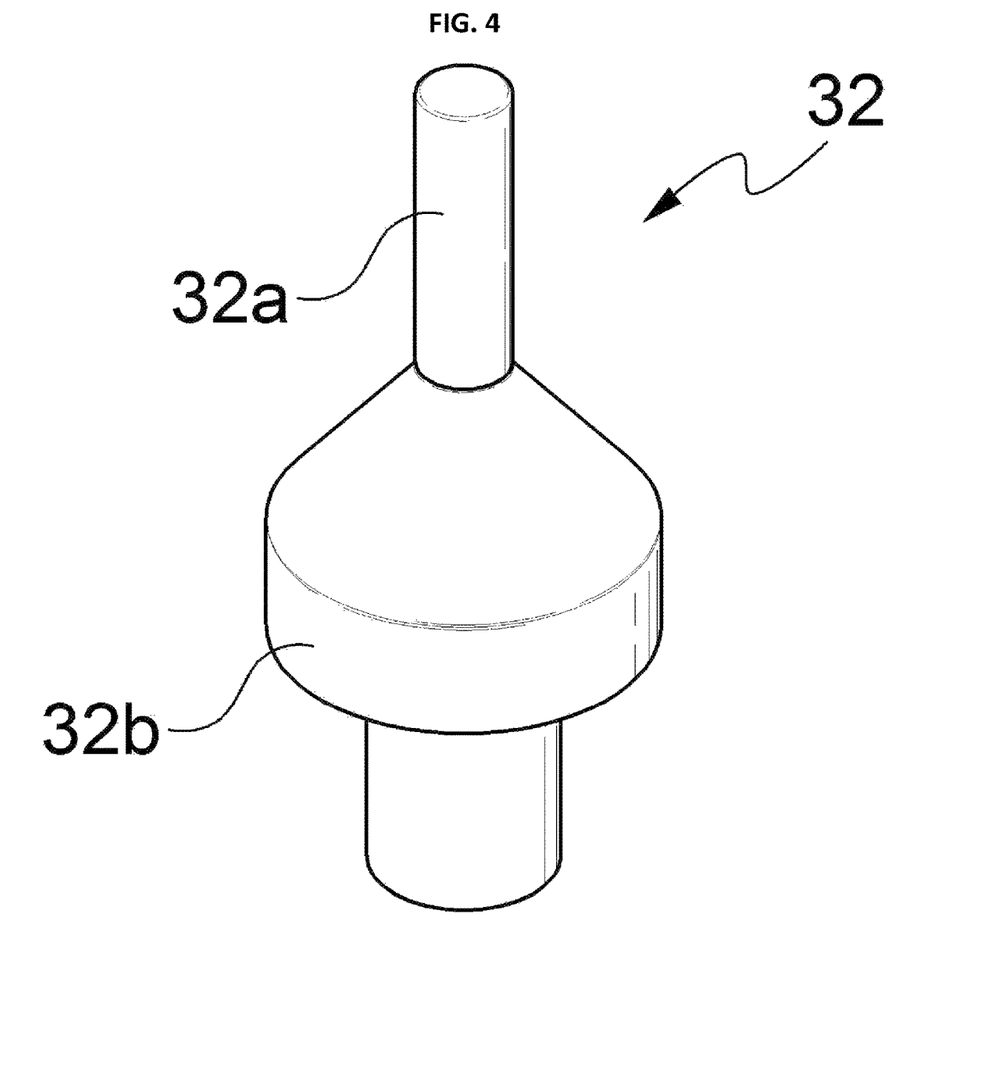
FIG. 4 is a perspective view illustrating a regulator according to the embodiment of the present invention.

FIG. 4 is a perspective view illustrating the regulator 32 according to the embodiment of the present invention.

Referring to FIG. 4, the regulator 32 may include a shaft 32a formed of a metal member and a lower member 32b formed of rubber or plastic below the shaft 32a. The metal member which forms the shaft 32a may be stainless steel. The regulator 32 may be manufactured in a method in which the lower member 32b is formed below the shaft 32a, which is formed of stainless steel, by using insert injection molding.

Figure 5:
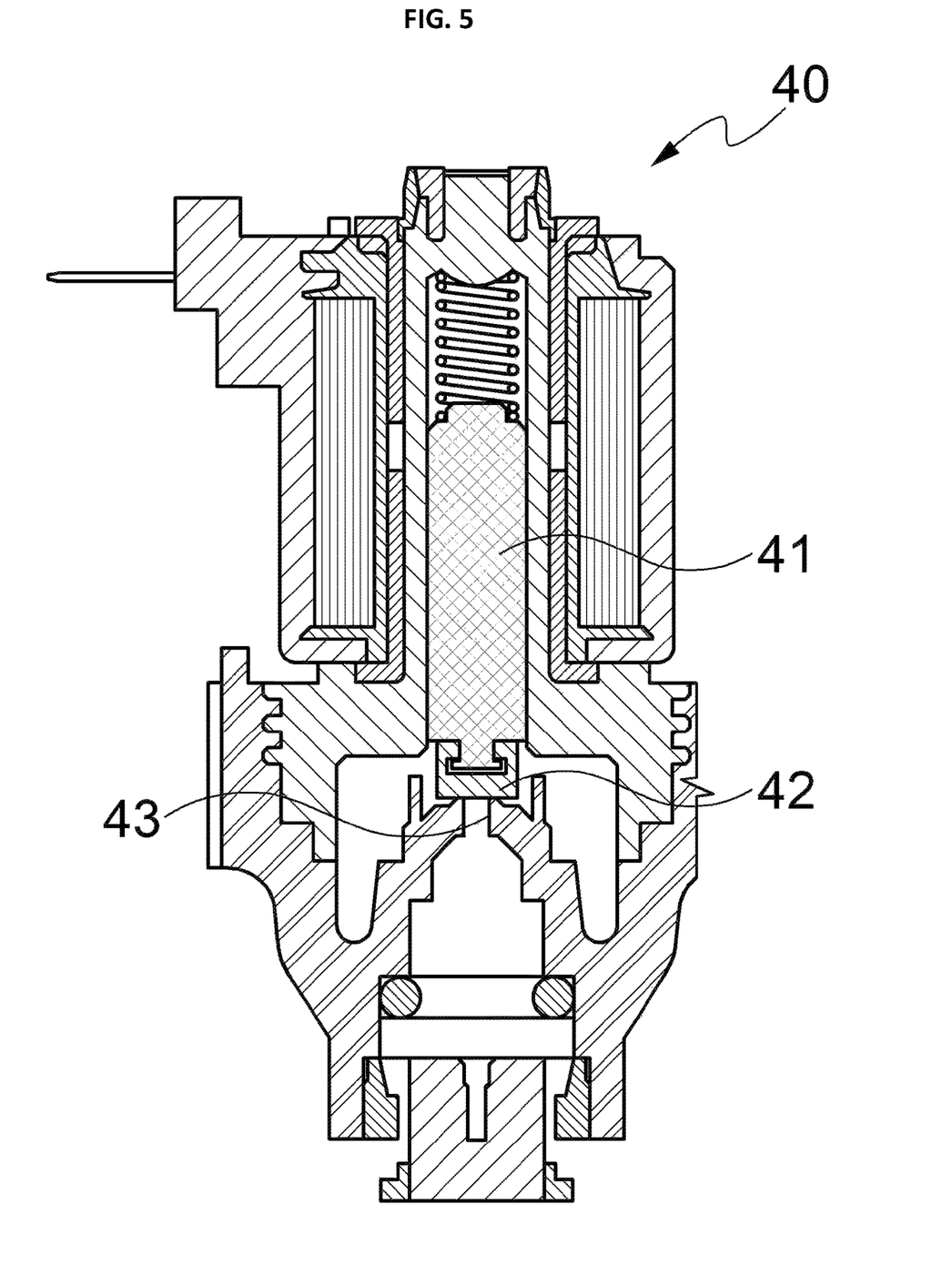
FIG. 5 is a cross-sectional view illustrating a discharging unit according to the embodiment of the present invention.

FIG. 5 is a cross-sectional view illustrating the discharging unit 40 according to the embodiment of the present invention.

Referring to FIG. 5, the discharging unit 40 may include an opening and closing member 41 that may selectively discharge a fluid, and a water outlet hole 43 which discharges the fluid passing through the opening and closing member 41 to the outside. A protective member 42 may be disposed at one end of the opening and closing member 41 for preventing the opening and closing member 41 and the water outlet hole 43 from being damaged when the opening and closing member 41 and the water outlet hole 43 come in contact with each other.

Since the opening and closing member 41 includes a diaphragm and the like, the opening and closing member 41 may be a pilot-type solenoid in which a pressure of a fluid also assists in opening and closing, and may be a direct acting solenoid which does not include the diaphragm and opens and closes using only electromagnetic force.

A cross-sectional area of the water outlet hole 43 may be smaller than a cross-sectional area of the inlet hole 21 of the inlet unit 20. That is, the cross-sectional area of the inlet hole 21 may be greater than the cross-sectional area of the water outlet hole 43.

Figure 6:
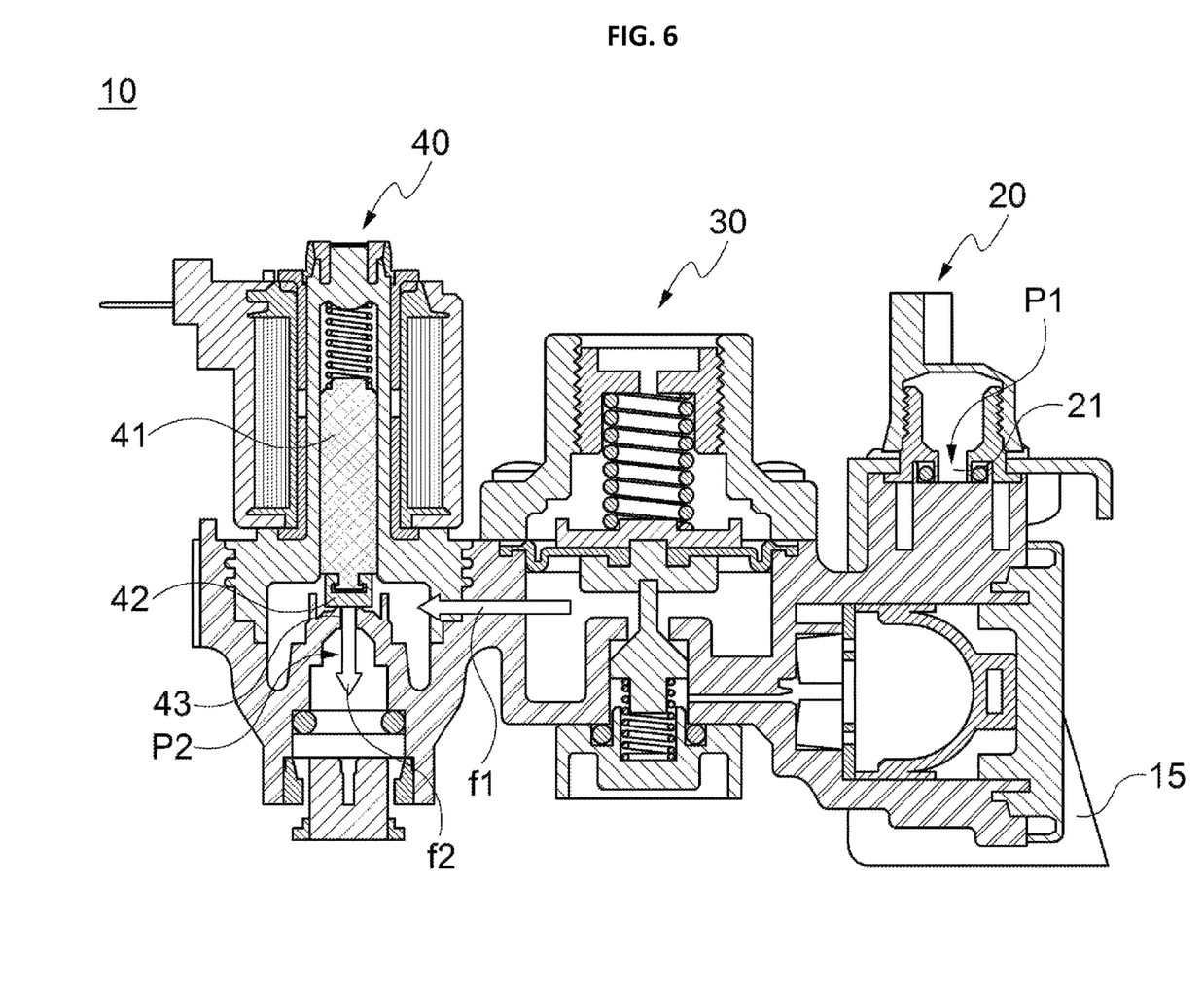
FIG. 6 is a view illustrating a flow of a fluid in the valve according to the embodiment of the present invention.

FIG. 6 is a view illustrating a flow of a fluid in the valve 10 according to the embodiment of the present invention.

Referring to FIG. 6, a pressure P2 of a fluid at a side of the water outlet hole 43 may be equal to or less than a pressure P1 of a fluid at a side of the inlet hole 21.

Further, a flow direction f1 of a fluid from the pressure adjusting unit 30 to the opening and closing member 41 may be perpendicular to a flow direction f2 of a fluid from the opening and closing member 41 to the water outlet hole 43.

The pressure adjusting unit 30 is integrated into the valve 10 according to the embodiment of the present invention, and thus noise in the valve 10 generated at low water pressure may be reduced. Further, the cost of the valve 10 may be improved by improving an operating voltage at low water pressure. In addition, the valve 10 may be prevented from being broken and damaged by an operation at low water pressure.

According to the embodiments of the present invention, a pressure adjusting unit having a pressure reduction function is formed between an inlet unit and a discharging unit, and thus the pressure adjusting unit can be integrated into a valve.

Further, according to the embodiments of the present invention, the pressure adjusting unit is integrated into the valve, and thus operating noise generated at low water pressure can be minimized.

Further, according to the embodiments of the present invention, the pressure adjusting unit is integrated into the valve, and thus manufacturing cost can be improved by improving an operating voltage at the low water pressure.

Further, according to the embodiments of the present invention, the pressure adjusting unit is integrated into the valve, and thus breakage and damage caused in a process of operating at low water pressure can be prevented.

While the present invention has been described above in detail with reference to representative embodiments, it may be understood by those skilled in the art that the embodiment may be variously modified without departing from the scope of the present invention. Therefore, the scope of the present invention is defined not by the described embodiment but by the appended claims, and encompasses equivalents that fall within the scope of the appended claims.

What is claimed is:

1. A valve comprising:
    an inlet unit including an inlet hole into which a fluid is introduced,
    a pressure adjusting unit to adjust a pressure of the fluid introduced through the inlet unit; and a discharging unit having an opening and closing member to selectively discharge the fluid which had its pressure adjusted, and a water outlet hole to discharge the fluid passing through the opening and closing member to the outside, wherein a cross-sectional area of the inlet hole is greater than a cross-sectional area of the water outlet, and a flow direction of a fluid from the pressure adjusting unit to the opening and ciosing member and a flow direction of a fluid from the opening and closing member to the water outlet hole are perpendicular to each other; and wherein the pressure adjusting unit includes:

an accommodating unit configured to accommodate a fluid;

a regulator configured to open and close an inlet of the accommodating unit:

a diaphragm configured to adjust a pressure of a fluid introduced into the accommodating unit: and an elastic member connected to the diaphragm wherein the inlet unit includes a mesh filter and a flow rate adjusting component.

2. The valve of claim 1, wherein a pressure of a fluid at a side of the water outlet hole is equal to or less than a pressure of a fluid at a side of the inlet hole.

3. The valve of claim 1, wherein the regulator comprises:

a shaft formed of a metal member; and a lower member formed of rubber or plastic below the shaft.

4. The valve of claim 3, wherein the metal member is stainless steel.

5. The valve of claim 1, wherein a bracket structure is formed at a side of the inlet unit.

6. The valve of claim 1, wherein the mesh filter has a curved surface shape.

7. The valve of claim 1, wherein the opening and closing member is a direct acting solenoid.

* * * * *